(12) United States Patent
Suzuki

(10) Patent No.: US 10,317,664 B2
(45) Date of Patent: Jun. 11, 2019

(54) MICROSCOPE DEVICE

(71) Applicant: Olympus Corporation, Shibuya-ku, Tokyo (JP)

(72) Inventor: Shingo Suzuki, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 64 days.

(21) Appl. No.: 14/803,627

(22) Filed: Jul. 20, 2015

(65) Prior Publication Data
US 2015/0323775 A1 Nov. 12, 2015

Related U.S. Application Data

(62) Division of application No. 12/942,211, filed on Nov. 9, 2010, now Pat. No. 9,122,070.

(30) Foreign Application Priority Data

Nov. 13, 2009 (JP) ................................. 2009-259914

(51) Int. Cl.
G02B 21/00 (2006.01)
G02B 21/18 (2006.01)
G02B 21/36 (2006.01)

(52) U.S. Cl.
CPC ......... *G02B 21/365* (2013.01); *G02B 21/002* (2013.01); *G02B 21/18* (2013.01)

(58) Field of Classification Search
CPC ................ G02B 21/00; G02B 21/0012; G02B 21/0016; G02B 21/002; G02B 21/0024;
(Continued)

(56) References Cited

U.S. PATENT DOCUMENTS 5,601,549 A * 2/1997 Miyagi .............. A61B 1/00193
606/4
5,655,029 A 8/1997 Rutenberg et al.
(Continued)

FOREIGN PATENT DOCUMENTS

JP 63116348 A 5/1988
JP 08114753 A 5/1996
(Continued)

OTHER PUBLICATIONS

Japanese Office Action dated Sep. 10, 2013, issued in counterpart Japanese Application No. 2009-259914.
(Continued)

*Primary Examiner* — Thong Q Nguyen
(74) *Attorney, Agent, or Firm* — Holtz, Holtz & Volek PC

(57) ABSTRACT

Reacquisition of an image is avoided, thus improving working efficiency. Provided is a microscope device including a plurality of confocal observation units or image capturing units that are capable of acquiring images of the same sample S, a region specifying unit that specifies, on a reference image acquired by a confocal observation unit or image capturing unit, an ROI of an observation image to be acquired by another image capturing unit or confocal observation unit, and a field-of-view displaying unit that displays, superimposed on the reference image, a maximum-limit indication indicating a maximum field of view of the other image capturing unit or confocal observation unit.

6 Claims, 13 Drawing Sheets

(58) Field of Classification Search
CPC ............ G02B 21/0028; G02B 21/0036; G02B 21/0052; G02B 21/008; G02B 21/06; G02B 21/36; G02B 21/361; G02B 21/365; G02B 21/367; A61B 1/00; A61B 1/00039

See application file for complete search history.

(56) References Cited

U.S. PATENT DOCUMENTS

| | | | |
|---|---|---|---|
| 5,995,867 A | | 11/1999 | Zavislan et al. |
| 6,081,371 A | * | 6/2000 | Shioda ............... G02B 21/0012 359/369 |
| 6,717,723 B2 | * | 4/2004 | Arai ................... G02B 21/002 359/202.1 |
| 6,738,190 B2 | | 5/2004 | Engelhardt et al. |
| 7,154,084 B2 | | 12/2006 | Hara |
| 7,194,118 B1 | | 3/2007 | Harris et al. |
| 7,223,986 B2 | | 5/2007 | Natori |
| 7,483,131 B2 | | 1/2009 | Takamizawa et al. |
| 7,639,357 B2 | | 12/2009 | Okugawa |
| 7,792,338 B2 | | 9/2010 | Bacus et al. |
| 7,969,582 B2 | | 6/2011 | Fujii |
| 9,122,070 B2 | * | 9/2015 | Suzuki ................. G02B 21/18 |
| 2002/0176160 A1 | | 11/2002 | Suzuki et al. |
| 2005/0020876 A1 | * | 1/2005 | Shioda ............... A61B 1/00039 600/101 |
| 2005/0122579 A1 | | 6/2005 | Sasaki |
| 2006/0071945 A1 | * | 4/2006 | Anabuki ............. G06F 3/0325 345/633 |
| 2006/0086887 A1 | | 4/2006 | Nakata et al. |
| 2007/0206275 A1 | | 9/2007 | Hemmer et al. |
| 2007/0272885 A1 | | 11/2007 | Yamashita et al. |
| 2008/0004603 A1 | * | 1/2008 | Larkin ................. B25J 9/1692 606/1 |
| 2008/0156999 A1 | | 7/2008 | Nishiwaki et al. |
| 2008/0290293 A1 | | 11/2008 | Motomura |
| 2011/0096393 A1 | * | 4/2011 | Araki ................. G02B 21/0032 359/390 |
| 2011/0109958 A1 | | 5/2011 | Yokoi |
| 2011/0122489 A1 | | 5/2011 | Matsuo |

FOREIGN PATENT DOCUMENTS

| | | |
|---|---|---|
| JP | 11052252 A | 2/1999 |
| JP | 11095119 A | 4/1999 |
| JP | 2002350320 A | 12/2002 |
| JP | 2003161893 A | 6/2003 |
| JP | 2005308985 A | 11/2005 |
| JP | 2006030296 A | 2/2006 |
| JP | 2006171024 A | 6/2006 |
| JP | 2007148223 A | 6/2007 |
| JP | 2008009395 A | 1/2008 |
| JP | 2009145774 A | 7/2009 |
| WO | 02073246 A2 | 9/2002 |

OTHER PUBLICATIONS

Extended European Search Report (EESR) dated Jan. 26, 2011 (in English) in counterpart European Application No. 10014466.6.

* cited by examiner

MICROSCOPE DEVICE

This application is a Divisional application of U.S. Ser. No. 12/942,211, filed Nov. 9, 2010, which is based on Japanese Patent Application No. 2009-259914, filed Nov. 13, 2009, the content of both of which is incorporated herein by reference.

BACKGROUND OF THE INVENTION

1. Field of the Invention

The present invention relates to microscope devices.

2. Description of Related Art

In a type of conventionally known microscope device, a plurality of devices for observation or stimulation are provided, and on a reference image including a sample, such as a cell, and acquired by one device, a region where the sample is to be stimulated or observed with another device is specified (e.g., Japanese Unexamined Patent Applications, Publication No. 2007-148223 and Publication No. 2006-171024). In a microscope device described in Japanese Unexamined Patent Application, Publication No. 2007-148223, two scanners are provided, one for observation and one for stimulation, and it is possible to specify an observation region or a stimulation region on a prescanned image acquired in advance. On the other hand, in a microscope device described in Japanese Unexamined Patent Application, Publication No. 2006-171024, on an image acquired by a CCD, it is possible to specify a measurement region where a pattern of illuminating light is cast by a DMD and spectral detection is performed with a PMT.

However, in the microscope devices described in Japanese Unexamined Patent Applications, Publication No. 2007-148223 and Publication No. 2006-171024, the maximum field of view is the same among the devices. If the maximum field of view varies among the devices, the observation region of a device with a large maximum field of view is restricted by a device with a small maximum field of view. This results in a disadvantage that the available field of view is not fully utilized.

That is, when an attempt is made to specify a region on a reference image with the maximum field of view varying among the devices, if the maximum field of view of a device with which the reference image is acquired is larger than the maximum field of view of a device with which the region is specified, sometimes there exists an area that cannot be specified on the reference image. In such cases, a reference image must be reacquired in accordance with the desired region, which reduces working efficiency.

BRIEF SUMMARY OF THE INVENTION

The present invention has been made in view of the situation described above, and it is an object thereof to provide a microscope device with which reacquisition of an image can be avoided, serving to improve working efficiency.

In order to achieve the above object, the present invention employs the following solutions.

According to one aspect of the present invention, a microscope device includes: a plurality of observation optical systems that are capable of acquiring images of a same sample; and a computer that displays, on a monitor, the images acquired by the plurality of observation optical systems, wherein the computer is configured to: specify, on a reference image acquired by one of the observation optical systems and displayed on the monitor, an acquisition region for acquiring an observation image with another one of the observation optical systems; and further display on the monitor, in a manner superimposed on the reference image, an indication indicating a maximum field of view of the other observation optical system.

According to another aspect of the present invention, a microscope device includes: a plurality of observation optical systems that are capable of acquiring images of a same sample; a region specifying unit that specifies, on a reference image acquired by one of the observation optical systems, an acquisition region for acquiring an observation image with another one of the observation optical systems; a plurality of light-path combining units that combine light paths of the observation optical systems; a switching unit that allows selective insertion or removal of the light-path combining units into or from the light paths; a storage unit that stores offset amounts between the light paths for the individual light-path combining units; and a field-of-view displaying unit that displays an indication indicating a common field of view common to all the observation optical systems based on the offset amounts for the individual light-path combining units.

According to a further aspect of the present invention, a microscope device includes: a plurality of observation optical systems that are capable of acquiring images of a same sample; a region specifying unit that specifies, on a reference image acquired by one of the observation optical systems, an acquisition region for acquiring an observation image with another one of the observation optical systems; a field-of-view displaying unit that displays, superimposed on the reference image, an indication indicating a maximum field of view of the other observation optical system; a plurality of light-path combining units that combine light paths of the observation optical systems; a switching unit that allows selective insertion or removal of the light-path combining units into or from the light paths; and a storage unit that stores offset amounts between the light paths for the individual light-path combining units, wherein the field-of-view displaying unit corrects a position of the indication indicating the maximum field of view of the other observation optical system based on an offset amount of the light-path combining unit selected by switching with the switching unit.

DETAILED DESCRIPTION OF THE INVENTION

Figure 1:
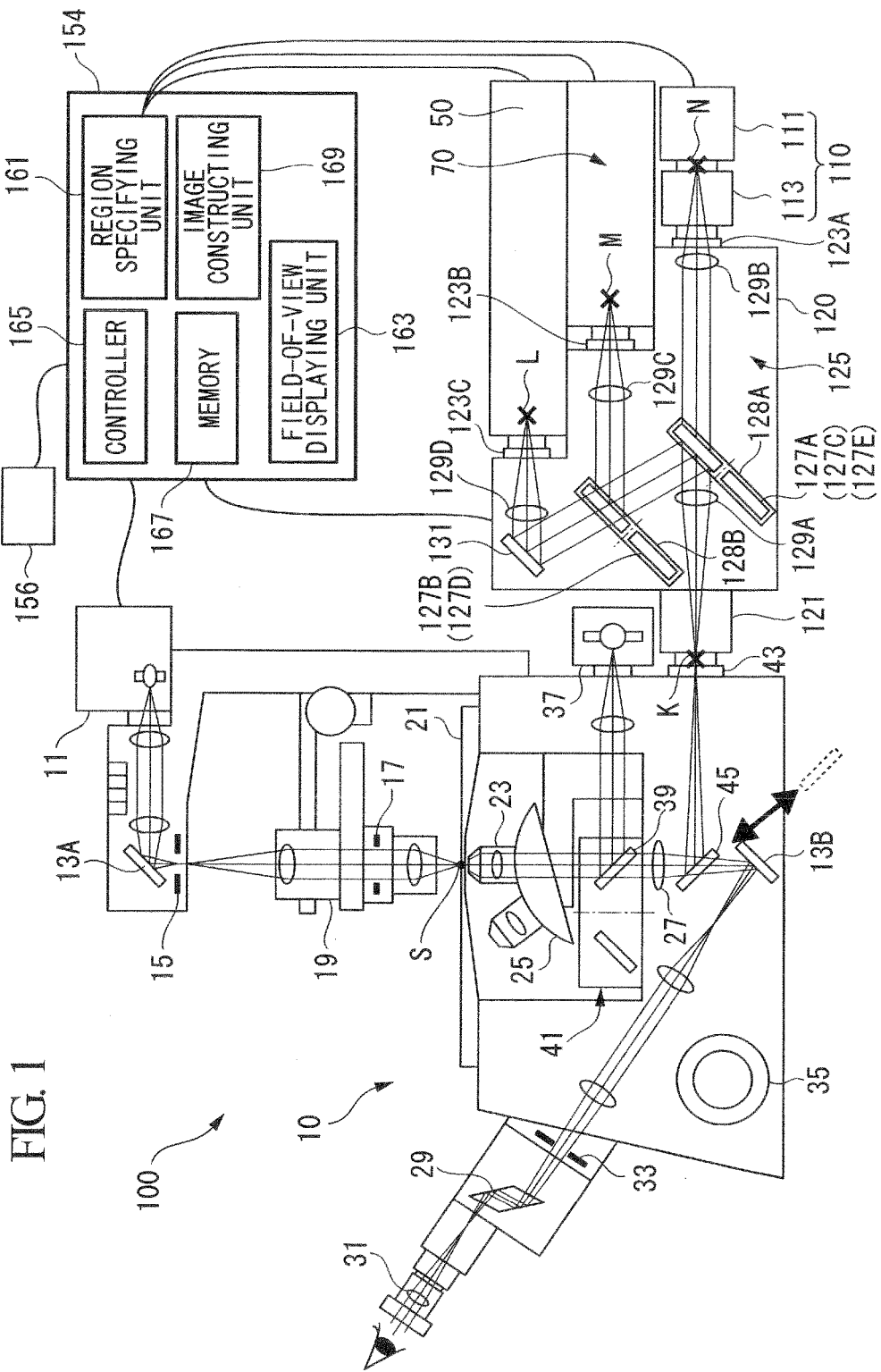
FIG. 1 is a diagram schematically showing the configuration of a microscope device according to an embodiment of the present invention.

A first aspect of the present invention is a microscope device including a plurality of observation optical systems that are capable of acquiring images of the same sample; a region specifying unit that specifies, on a reference image acquired by one of the observation optical systems, an acquisition region for acquiring an observation image with another one of the observation optical systems; and a field-of-view displaying unit that displays, superimposed on the reference image, an indication indicating a maximum field of view of the other observation optical system.

According to this aspect, the region specifying unit specifies an acquisition region of an observation image on a reference image of a sample. Thus, it is possible to readily select a sample and perform observation as desired by using a plurality of observation optical systems with different observation methods. In this case, since the field-of-view displaying unit displays an indication indicating the maximum field of view of the observation optical system that acquires the observation image superimposed on the reference image, it is possible to ascertain in advance an acquisition region of the observation image that can be specified when acquiring the reference image.

Therefore, even if the maximum field of view varies between the observation optical system that acquires the reference image and the observation optical system that acquires the observation image, it is possible to avoid reacquiring the reference image in accordance with a desired acquisition region of the observation image. Accordingly, it is possible to fully utilize the individual fields of view of the plurality of observation optical systems and to improve working efficiency.

In the above aspect, the microscope device may further include a plurality of light-path combining units that combine light paths of the observation optical systems; a switching unit that allows selective insertion or removal of the light-path combining units into or from the light paths; and a storage unit that stores offset amounts between the light paths for the individual light-path combining units, and the field-of-view displaying unit may correct the position of the indication indicating the maximum field of view of the other observation optical system based on the offset amount of the light-path combining unit selected by switching with the switching unit.

With this configuration, even in a case where the switching unit performs switching of the light-path combining units to acquire observation images with different observation optical systems, it is possible to specify acquisition regions of the observation images effectively within the maximum fields of view of the individual observation optical systems based on indications indicating the maximum fields of view displayed at positions corrected by the field-of-view displaying unit. For example, this is particularly effective in a case where a sample is observed by using a predetermined light path with one of the light-path combining units. An offset amount refers to an amount of deviation in a direction perpendicular to the optical axis.

In the above aspect, the microscope device may further include a fitting device that matches an acquisition region of the reference image with the maximum field of view of the other observation optical system.

With this configuration, by using the fitting device, it is possible to exclude from the reference image an unnecessary area that cannot be specified as an acquisition region of the observation image.

A second aspect of the present invention is a microscope device including a plurality of observation optical systems that are capable of acquiring images of the same sample; a region specifying unit that specifies, on a reference image acquired by one of the observation optical systems, an acquisition region for acquiring an observation image with another one of the observation optical systems; a plurality of light-path combining units that combine light paths of the observation optical systems; a switching unit that allows selective insertion or removal of the light-path combining units into or from the light paths; a storage unit that stores offset amounts between the light paths for the individual light-path combining units; and a field-of-view displaying unit that displays an indication indicating a common field of view common to all the observation optical systems based on the offset amounts for the individual light-path combining units.

According to this aspect, with the indication indicating the common field of view displayed by the field-of-view displaying unit, it is possible to ascertain in advance an acquisition region of an observation image that can be specified when acquiring a reference image. In this case, even when the switching unit performs switching of the light-path combining units to acquire observation images with different observation optical systems, it is possible to specify acquisition regions of the observation images within the field of view common to all the observation optical systems. For example, this is particularly effective in a case where a sample is observed continuously with different observation optical systems by switching the light-path combining units.

In this aspect, the microscope device may further include a fitting device that matches an acquisition region of the reference image with the common field of view.

In the above aspect, the field-of-view displaying unit may display, superimposed on the reference image, an indication indicating the size of the largest observation image that can be acquired at once by the other observation optical system.

If it is possible to acquire an observation image of a sample at once, working efficiency is improved compared with the case where multiple operations are needed to acquire the observation image of the sample. Thus, since the field-of-view displaying unit displays an indication indicating the size of the largest observation image that can be acquired at once, it is possible to simply and reliably find a sample of a size suitable for observation. This serves to avoid respecifying an acquisition region of the observation image.

In the above aspect, the field-of-view displaying unit may display, superimposed on the reference image, an indication indicating the size of the smallest observation image that can be acquired by the other observation optical system.

With this configuration, it is possible to specify an acquisition region of the observation image more specifically based on the indication indicating the size of the smallest observation image displayed by the field-of-view displaying unit. For example, this is effective in a case where an acquisition region of an observation image is specified on a reference image acquired with a large magnification factor.

In the above aspect, the other observation optical system may include a scanning unit that scans light two-dimensionally over the sample, and the field-of-view displaying unit may display scanning directions of the scanning unit on the reference image.

With this configuration, in the case where the scanning speed of the scanning unit differs depending on the scanning direction, by setting an acquisition region of an observation image such that it is smaller in a direction in which the scanning unit has a low scanning speed, it is possible to increase the frame rate and to thereby reduce the observation time.

In the above aspect, the other observation optical system may include an image capturing element having a plurality of pixels that are arrayed two-dimensionally, and the field-of-view displaying unit may display array directions of the pixels on the reference image.

With this configuration, by setting an acquisition region of an observation image such that it is small in one of the pixel array directions so that the number of lines in partial transfer (subarray transfer) in which only image data corresponding to pixels in a limited region is transferred, it is possible to increase the frame rate and to thereby reduce the observation time.

A third aspect of the present invention is a microscope device including an observation optical system that is capable of acquiring an image of a sample; a stimulation optical system that irradiates the sample with light to stimulate the sample; a region specifying unit that specifies a stimulation region to be stimulated by the stimulation optical system on the image acquired by the observation optical system; and a field-of-view displaying unit that displays, superimposed on the image, an indication indicating a maximum field of view of the stimulation optical system.

According to this aspect, the region specifying unit specifies a stimulation region of the stimulation optical system on an image of a sample. Thus, it is possible to readily select a sample and perform observation as desired. In this case, since the field-of-view displaying unit displays an indication indicating the maximum field of view of the stimulation optical system superimposed on the image, it is possible to ascertain in advance a stimulation region that can be specified when acquiring the image.

Therefore, even if the maximum field of view varies between the observation optical system and the stimulation optical system, it is possible to avoid reacquiring an image in accordance with a desired stimulation region. Accordingly, it is possible to fully utilize the individual fields of view of the observation optical system and the stimulation optical system and to improve working efficiency.

In this aspect, the microscope device may further include a plurality of light-path combining units that combine a light path of the observation optical system with light paths of a plurality of stimulation optical systems; a switching unit that allows selective insertion or removal of the light-path combining units into or from the light paths; and a storage unit that stores offset amounts between the light paths for the individual light-path combining units, and the field-of-view displaying unit may correct the position of the indication indicating the maximum field of view of the stimulation optical system based on the offset amount for the light-path combining unit selected by switching with the switching unit.

With this configuration, even in a case where the switching unit performs switching of the light-path combining units to stimulate the sample with different stimulation optical systems, it is possible to specify stimulation regions effectively within the maximum fields of view of the individual stimulation optical systems based on indications indicating the maximum fields of view displayed at positions corrected by the field-of-view displaying unit. For example, this is particularly effective in a case where a sample is stimulated by using a predetermined light path with one of the light-path combining units.

In this aspect, the microscope device may further include a fitting device that matches an acquisition region of the image with the maximum field of view of the stimulation optical system.

With this configuration, by using the fitting device, it is possible to exclude from the image an unnecessary area that cannot be specified as a stimulation region.

A fourth aspect of the present invention is a microscope device including an observation optical system that is capable of acquiring an image of a sample; a plurality of stimulation optical systems that irradiate the sample with light to stimulate the sample; a region specifying unit that specifies a stimulation region to be stimulated by the stimulation optical system on the image acquired by the observation optical system; a plurality of light-path combining units that combine a light path of the observation optical system with light paths of the stimulation optical systems; a switching unit that allows selective insertion or removal of the light-path combining units into or from the light paths; a storage unit that stores offset amounts between the light paths for the individual light-path combining units; and a field-of-view displaying unit that displays an indication indicating a common field of view common to all the stimulation optical systems based on the offset amounts for the individual light-path combining units.

According to this aspect, with the indication indicating the common field of view displayed by the field-of-view displaying unit, it is possible to ascertain in advance a stimulation region that can be specified when acquiring an image. In this case, even when the switching unit performs switching of the light-path combining units to stimulate the sample with different stimulation optical systems, it is possible to specify stimulation regions within the field of view common to all the stimulation optical systems. For example, this is particularly effective in a case where a sample is stimulated continuously with different stimulation optical systems by switching the light-path combining units.

In this aspect, the microscope device may further include a fitting device that matches an acquisition region of the image with the common field of view.

In the above aspect, the field-of-view displaying unit may display, superimposed on the image, an indication indicating the size of a maximum area that can be stimulated at once by the stimulation optical system.

If it is possible to acquire stimulate the sample at once, working efficiency is improved compared with the case where multiple operations are needed to stimulate the sample. Thus, since the field-of-view displaying unit displays an indication indicating the size of the largest area that can be stimulated at once, it is possible to simply and reliably find a sample of a size suitable for stimulation. This serves to avoid respecifying a stimulation region.

In the above aspect, the field-of view-displaying unit may display, superimposed on the image, an indication indicating the size of a minimum area that can be stimulated by the stimulation optical system.

With this configuration, it is possible to specify a stimulation region specifically with the region specifying unit based on the indication indicating the size of the minimum area that can be stimulated.

In the above aspect, the stimulation optical system may include a scanning unit that scans light two-dimensionally over the sample, and the field-of-view displaying unit may display scanning directions of the scanning unit on the image.

With this configuration, in the case where the scanning speed of the scanning unit differs depending on the scanning direction, by setting a stimulation region such that it is smaller in a direction in which the scanning unit has a low scanning speed, it is possible to increase the frame rate and to thereby shorten the time required.

Now, a microscope device according to an embodiment of the present invention will be described with reference to the drawings.

As shown in FIG. 1, a microscope device 100 according to this embodiment includes a microscope 10 for visually observing a sample S, an observation unit (observation optical system and stimulation optical system) 50 for performing confocal observation of the sample S, a stimulating unit (stimulation optical system) 70 for stimulating the sample S with light, an image capturing unit (observation optical system) 110 for acquiring a two-dimensional image of the sample S, and a connecting unit 120 for optically connecting the microscope 10 to the observation unit 50, the stimulating unit 70, and the image capturing unit 110. Hereinafter, the observation unit 50, the stimulating unit 70, and the image capturing unit 110 will be referred to simply as "units 50, 70, and 110."

Furthermore, the microscope device 100 includes a laser unit (not shown) that generates laser light, a computer 154 that controls the microscope device 100 as a whole and that performs information processing, storage, image construction, etc., and a monitor 156 that displays information or images processed by the computer 154. The laser unit includes single-mode fibers 141 and 142 and collimator lenses 143 and 144 (see FIGS. 2 and 3) that guide laser light to the observation unit 50 and the stimulating unit 70.

The microscope 10 includes a halogen lamp 11 that emits illuminating light for transmission observation, a condenser 19 that condenses the illuminating light emitted from the halogen lamp 11 and reflected by a first reflecting mirror 13A onto the sample S on a stage 21 via a field stop (FS) 15 and an aperture stop (AS) 17, and a plurality of objective lenses 23 that focus light transmitted through the sample S as a result of irradiating the sample S with the illuminating light condensed by the condenser 19. The objective lenses 23 are supported by a revolver 25.

Furthermore, the microscope 10 includes an image forming lens 27 that forms an image by using light coming through the objective lens 23 and an eyepiece lens 31 for visually observing an image formed via the image forming lens 27 and split by a prism 29 via a second reflecting mirror 13B. Reference sign 33 denotes a shutter, and reference sign 35 denotes a focus knob for performing focusing.

Furthermore, the microscope 10 includes a mercury lamp 37 that emits illuminating light for observation with epi-illumination and a beam splitter 39 that reflects the illuminating light emitted from the mercury lamp 37 toward the objective lens 23 to irradiate the sample S and transmits observation light from the sample S so that the observation light enters the image forming lens 27.

The beam splitter 39 is provided in a cube turret 41 for switching the microscopy method. The beam splitter 39 is formed to have a wedge shape whose thickness gradually changes along the longitudinal direction so that light reflected by the back face thereof has an angle relative to the optical axis.

The microscope 10 is provided with an external connection port 43 for connecting the connecting unit 120. Furthermore, between the image forming lens 27 and the second reflecting mirror 13B, a switching mirror 45 is retractably provided. When the switching mirror 45 is removed from the light path of the microscope 10, a primary image of the sample S is formed on the side of the eyepiece lens 31. On the other hand, when the switching mirror 45 is placed in the light path of the microscope 10, a primary image of the sample S is formed on the side of the connecting unit 120 (a primary-image point K in FIG. 1) via the external connection port 43.

Figure 2:
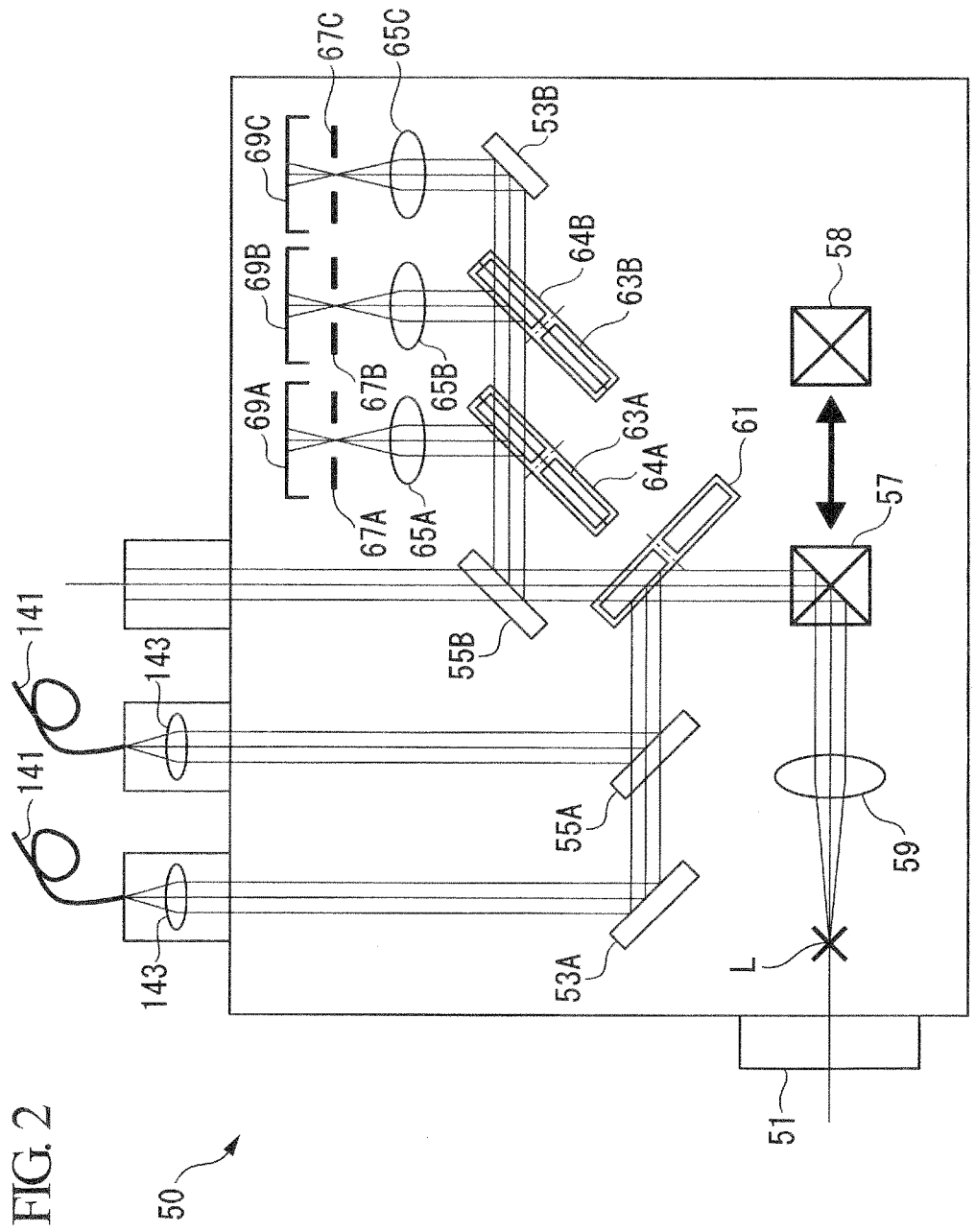
FIG. 2 is a diagram schematically showing the configuration of a confocal observation unit in FIG. 1.

As shown in FIG. 2, the observation unit 50 includes a connector 51 that is connected to the connecting unit 120. Furthermore, the observation unit 50 includes a first reflecting mirror 53A and a first beam splitter 55A that reflect laser light guided from the laser unit via the single-mode fiber 141 and formed into collimated light by the collimator lens 143, a galvanometric scanner (scanning unit) 57 that two-dimensionally scans the laser light reflected by these devices over the sample S of the microscope 10, and a pupil projection lens 59 that focuses the laser light scanned by the galvanometric scanner 57 at a secondary-image point L of the sample S.

Furthermore, the observation unit 50 includes a dichroic mirror 61. The dichroic mirror 61 reflects the laser light reflected by the first reflecting mirror 53A or the first beam splitter 55A to the galvanometric scanner 57 and transmits fluorescence generated at the sample S irradiated with the laser light and de-scanned by the galvanometric scanner 57.

The galvanometric scanner 57 is switchable to a galvanometric scanner (scanning unit) 58.

Furthermore, the observation unit 50 includes dichroic mirrors 63A and 63B and a second reflecting mirror 53B that reflect, depending on the wavelength, the fluorescence transmitted through the dichroic mirror 61 and reflected by a second beam splitter 55B, confocal pinholes 67A, 67B, and 67C that partially pass the fluorescence reflected by these devices and focused by confocal lenses 65A, 65B, and 65C, and photomultiplier tubes (PMTs) 69A, 69B, and 69C that detect the fluorescence transmitted through the confocal pinholes 67A, 67B, and 67C.

The dichroic mirrors 63A and 63B are provided in filter turrets 64A and 64B, and are switchable in accordance with the relevant spectral wavelength characteristics.

The PMTs 69A, 69B, and 69C are configured to output detection signals for individual pixels, obtained by detecting fluorescence, to the computer 154. Thus, the computer 154 constructs a two-dimensional image based on the input detection signals, and the two-dimensional image is displayed on the monitor 156.

Figure 3:
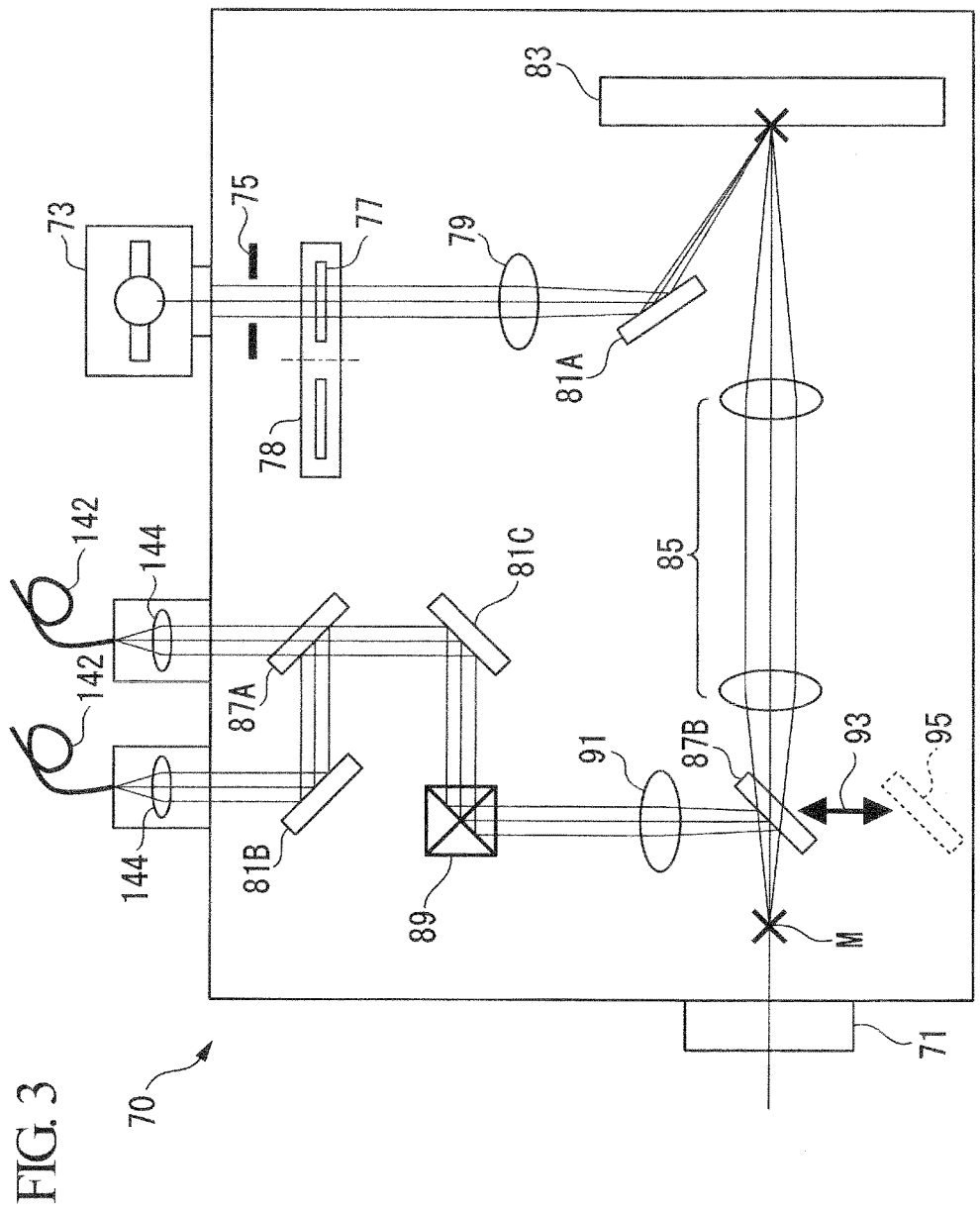
FIG. 3 is a diagram schematically showing the configuration of a stimulating unit in FIG. 1.

As shown in FIG. 3, the stimulating unit 70 includes a connector 71 that is connected to the connecting unit 120. Furthermore, the stimulating unit 70 includes a mercury lamp 73 that emits light, a shutter 75 for passing or blocking the light emitted from the mercury lamp 73, an excitation filter 77 that transmits light having passed through the shutter 75 and having a predetermined wavelength, a DMD (microdeflector array) 83 that deflects the light transmitted through the excitation filter 77 and focused by a focusing lens 79 via a first reflecting mirror 81A, and a relay optical system 85 that focuses the light deflected by the DMD 83 to a secondary-image point M of the sample S.

The mercury lamp 73 is provided removably on the frame of the stimulating unit 70.

The excitation filter 77 is provided in a filter turret 78, and it is switchable in accordance with the wavelength characteristics.

The DMD 83 includes a plurality of pivotable micromirrors (not shown) that are arrayed two-dimensionally at a position conjugate with the position of an image formed via the image forming lens 27 and relayed by the relay optical system 85. The micromirrors may be configured so that the ON/OFF areas thereof can be arbitrarily chosen by the computer 154. With the micromirrors, it is possible to stimulate multiple points of the sample S simultaneously or to stimulate a specified area of the sample S.

Furthermore, the stimulating unit 70 includes a second reflecting mirror 81B, a first beam splitter 87A, and a third reflecting mirror 81C that reflect the laser light guided from the laser unit via the single-mode fiber 142 and transmitted through the collimator lens 144, a galvanometric scanner 89 that two-dimensionally scans the laser light reflected by these devices over the sample S of the microscope 10 via the connector 71, and a pupil projection lens 91 that focuses the laser light scanned by the galvanometric scanner 89 to the secondary-image point M of the sample S.

The laser light scanned by the galvanometric scanner 89 can be combined by the second beam splitter 87B into the path of the light deflected by the DMD 83. The second beam splitter 87B has such characteristics that it transmits the light deflected by the DMD 83 and reflects the laser light scanned by the galvanometric scanner 89.

The second beam splitter 87B may be disposed in such a manner that it is switchable to a switching mirror 95 by a switching unit 93 such as a filter turret. The switching mirror 95 is placed in the light path when the sample S is to be stimulated with the light emitted from the mercury lamp 73, and is removed from the light path when the sample S is to be stimulated with the laser light guided from the laser unit.

The image capturing unit 110 includes a CCD (image capturing device) 111 having a two-dimensional array of pixels (not shown). With the CCD 111, it is possible to capture an image of the sample S formed at a secondary-image point N via the image forming lens 27. The two-dimensional image acquired by the CCD 111 is displayed on the monitor 156.

Since a two-dimensional image capturing device, such as a CCD, detects light on a plane, the frame rate is higher compared with the case of confocal observation. Therefore, with the CCD 111, for example, it is possible to capture the quick response of a calcium ion or the like. For example, the CCD 111 has a field of view rotated by 3° about the axis relative to the field of view of the observation unit 50.

Furthermore, attachment mounts for CCD cameras are usually standardized, and the distance from the attachment surface to the photoreceptor surface (flange back) is predetermined. Therefore, the CCD 111 is connected to the connecting unit 120 via a connector and a camera adapter 113 for adaptation to the CCD camera mount. The camera adapter 113 may function as a magnification adapter or a filter turret in addition to adapting to the mount and providing a certain distance.

The connecting unit 120 includes a microscope connection port 121 that is connected to the external connection port 43 of the microscope 10, a first connection port 123A that is connected to the camera adapter 113 of the image capturing unit 110, a second connection port 123B that is connected to the connector 71 of the stimulating unit 70, and a third connection port 123C that is connected to the connector 51 of the observation unit 50. Hereinafter, the first connection port 123A, the second connection port 123B, and the third connection port 123C will be referred to as unit connection ports 123A, 123B, and 123C. These unit connection ports 123A, 123B, and 123C may all have the same shape.

Furthermore, the connecting unit 120 includes a connecting-unit optical system 125 that optically connects the microscope 10 to the image capturing unit 110, the stimulating unit 70, and the observation unit 50, and includes light-path combining units 127A and 127B, such as dichroic mirrors, that combine light paths of the connecting-unit optical system 125.

The connecting-unit optical system 125 relays a primary image of the sample S formed via the image forming lens 27 to the observation unit 50, the stimulating unit 70, and the image capturing unit 110. The connecting-unit optical system 125 may be configured to form substantially collimated light.

Furthermore, the connecting-unit optical system 125 includes a first relay lens 129A that shapes light entering from the microscope 10 via the microscope connection port 121 into substantially collimated light, a second relay lens 129B that focuses, via the first connection port 123A, the light transmitted through the first relay lens 129A, a third relay lens 129C that focuses, via the second connection port 123B, the light transmitted through the first relay lens 129A, and a fourth relay lens 129D that focuses, via the third connection port 123C, the light transmitted through the first relay lens 129A.

The first relay lens 129A and the second relay lens 129B are configured to relay a primary image of the sample S to the secondary-image point N in the image capturing unit 110. The first relay lens 129A and the third relay lens 129C are configured to relay a primary image of the sample S to the secondary-image point M in the stimulating unit 70. The first relay lens 129A and the fourth relay lens 129D are configured to relay a primary image of the sample S to the secondary-image point L in the observation unit 50.

Between the first relay lens 129A and the second relay lens 129B, a first light-path combining unit 127A that transmits light captured by the CCD 111 of the image capturing unit 110 and reflects light at other wavelengths is provided. On the opposite side of the first light-path combining unit 127A, a second light-path combining unit 127B that reflects light coming from the first light-path combining unit 127A to the third relay lens 129C and transmits light at other wavelengths is provided. On the transmitting side of the second light-path combining unit 127B, a reflecting mirror 131 that reflects light transmitted through the second light-path combining unit 127B to the fourth relay lens 129D is provided.

Since these light-path combining units 127A and 127B are disposed in the path of substantially collimated light, image degradation due to astigmatic difference can be prevented. Astigmatic difference refers to the difference between the points at which light is focused in two directions perpendicular to the optical axis. Alternatively, by arranging the connecting-unit optical system 125 to form non-collimated light, it is possible to prevent light from being reflected by the back faces of the light-path combining units 127A and 127B, thereby preventing image degradation caused by interference fringes.

The light-path combining units 127A and 127B are provided in disk-shaped filter turrets (switching units) 128A and 128B that can be rotated by motors (not shown). The light-path combining units are arranged in such a manner that they can be switched to light-path combining units 127C, 127D, 127E, etc. in accordance with the wavelength characteristics. Alternatively, the light-path combining units 127A and 127B may be formed of a plurality of beam splitters, mirrors, and pieces of glass (not shown), with the beam splitters provided removably in the filter turrets 128A and 128B.

The secondary images of the sample S relayed by the connecting-unit optical system 125 may be formed at points equidistant from the individual unit connection ports 123A, 123B, and 123C. That is, the distance from the first connection port 123A to the secondary-image point N, the distance from the second connection port 123B to the secondary-image point M, and the distance from the third connection port 123C to the secondary-image point L may be all the same. In this case, it is possible to connect the observation unit 50, the stimulating unit 70, and the image capturing unit 110 to the unit connection ports 123A, 123B, and 123C in free combinations. Accordingly, the ability to change the observation method can be increased.

The laser unit may include, for example, a laser oscillator, a wavelength selector, a laser intensity modulator, etc. so that the laser unit can adjust laser light emitted by the laser oscillator to a wavelength and intensity suitable for observation by using the wavelength selector and the laser intensity modulator before outputting the laser light.

Figure 4A:
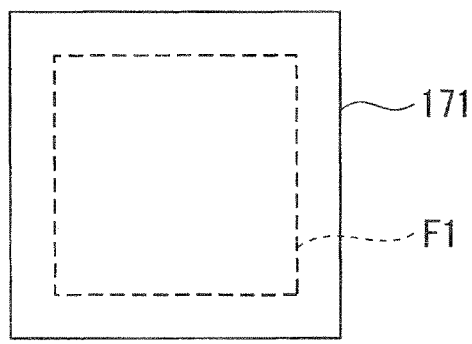
FIG. 4A is a diagram showing a state where a maximum-limit indication is displayed superimposed on a reference image.

The computer 154 includes a region specifying unit 161 that specifies a region of interest (ROI) on an image acquired by either the observation unit 50 or the image capturing unit 110 (hereinafter referred to as a "reference image"), such as an ROI (acquisition region) where an image is to be acquired by another image capturing unit 110 or the observation unit 50 (hereinafter referred to as an "observation image") or an ROI (stimulation region) that is to be stimulated by the stimulating unit 70, and includes a field-of-view displaying unit 163 that displays a maximum-limit indication F1 indicating a maximum field of view of the image capturing unit 110, the observation unit 50, or the stimulating unit 70 superimposed on a reference image 171, as shown in FIG. 4A. The observation unit 50 has the largest field of view, the image capturing unit 110 has the second largest, and the stimulating unit 70 has the smallest.

When the light-path combining units 127A and 128B are switched to the light-path combining units 127C, 127D, 127E, etc. by the filter turrets 128A and 128B, the field-of-view displaying unit 163 corrects the position of the maximum-limit indication F1 indicating the maximum field of view of the unit 50, 70, or 110 based on offset amounts for the light-path combining units 127C, 127D, 127E, etc. stored in a memory 167.

Figure 4B:
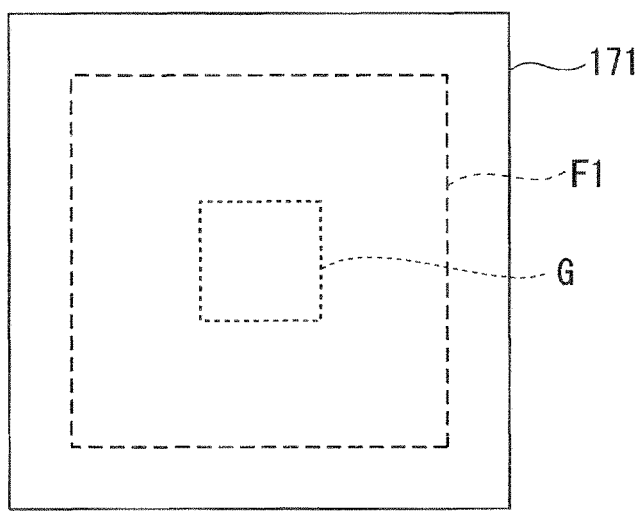
FIG. 4B is a diagram showing a state where a maximum-size indication is displayed superimposed on the reference image.
Figure 4C:
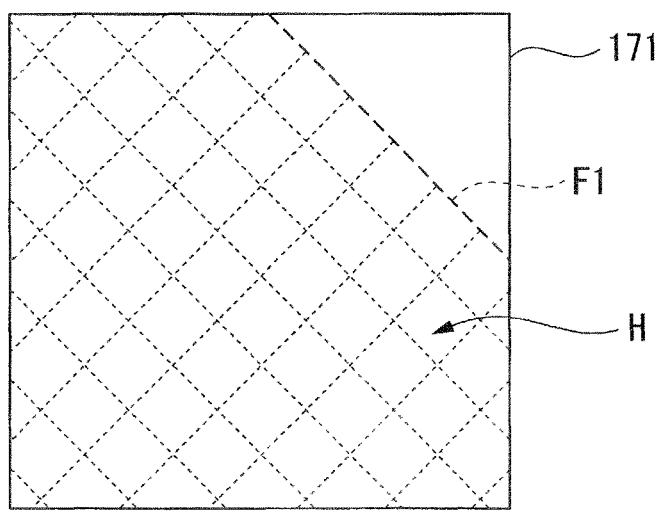
FIG. 4C is a diagram showing a state where a minimum-size indication is displayed superimposed on the reference image.

Furthermore, as shown in FIG. 4B, the field-of-view displaying unit 163 is capable of displaying a maximum-size indication G superimposed on the reference image 171, the maximum-size indication G indicating the size of a largest observation image that can be acquired at once by the CCD 111 or the PMT 69A, 69B, or 69C or the size of a maximum area that can be stimulated at once by the DMD 83. Furthermore, as shown in FIG. 4C, the field-of-view displaying unit 163 is capable of displaying a minimum-size indication H superimposed on the reference image 171, the minimum-size indication H indicating the size of a smallest observation image that can be acquired by the CCD 111 or the PMT 69A, 69B, or 69C or the size of a minimum area that can be stimulated by the DMD 83.

Figure 5:
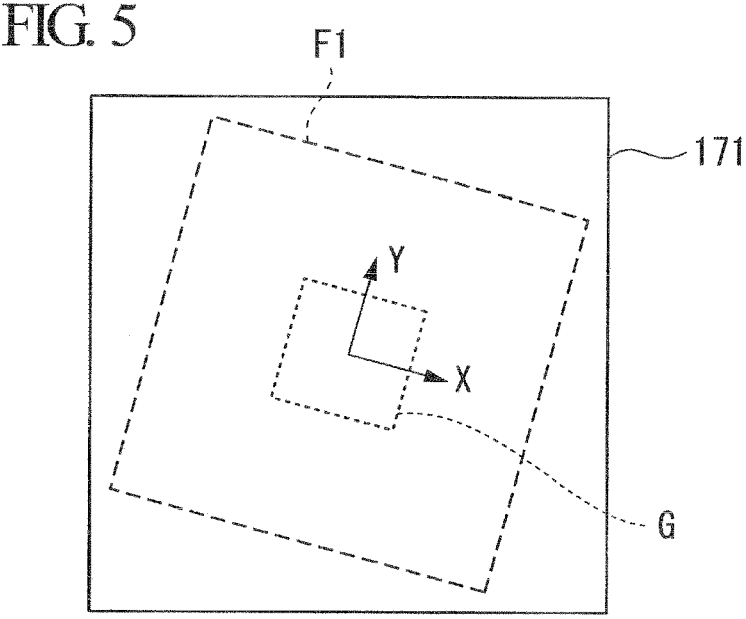
FIG. 5 is a diagram showing a state where X and Y directions are displayed on the reference image.

Furthermore, as shown in FIG. 5, the field-of-view displaying unit 163 is capable of displaying scanning directions of the galvanometric scanner 57 (X and Y directions) and the array directions of the pixels of the CCD 111 (X and Y directions) on the reference image 171. When the scanning speeds differ between the X and Y directions, the direction with the faster scanning speed is considered as the X direction and the direction with the lower scanning speed is considered as the Y direction.

Furthermore, the computer 154 includes a controller (fitting device) 165 that controls the pivot angle range, scan angle, scan timing, etc. of the galvanometric scanner 57 in the observation unit 50 and switching of the light-path combining units 127A and 127B by the filter turrets 128A and 128B, a memory (storage unit) 167 that stores reference information for each of the units 50, 70, and 110, and an image constructing unit 169 that constructs an image.

Figure 6A:
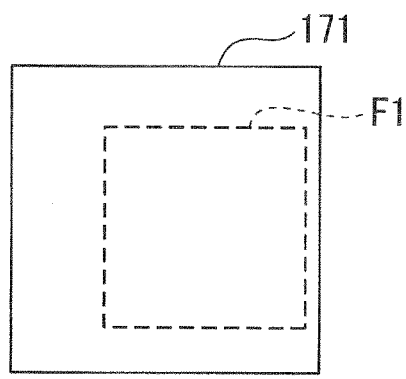
FIG. 6A is a diagram showing a state where an image acquisition region has been shifted.
Figure 6B:
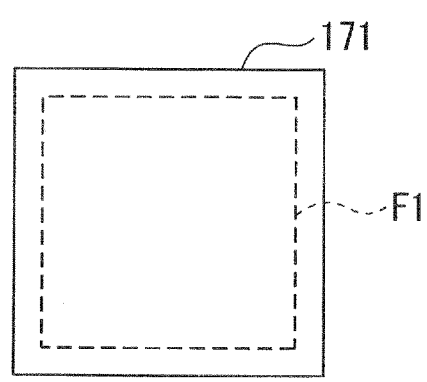
FIG. 6B is a diagram showing a state where the image magnification factor has been changed.
Figure 6C:
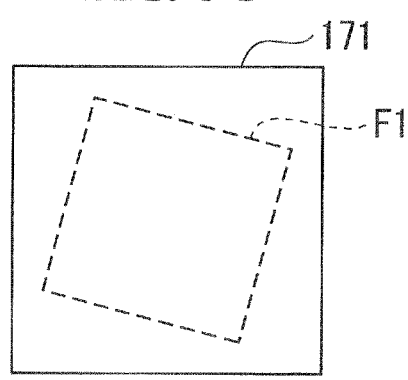
FIG. 6C is a diagram showing a state where the image angle has been changed about the axis of the field of view.

The controller 165 is capable of adjusting the pivot angle range of the galvanometric scanner 57 to shift an image acquisition region (hereinafter referred to as "pan control"), as shown in FIG. 6A. Furthermore, the controller 165 is capable of adjusting the scan angle of the galvanometric scanner 57 to change the image magnification factor (hereinafter referred to as "zoom control"), as shown in FIG. 6B. Furthermore, the controller 165 is capable of adjusting the timing of two-dimensional scanning by the galvanometric scanner 57 to rotate the image about the axis of the field of view (hereinafter referred to as "rotation control"), as shown in FIG. 6C.

As reference information, the memory 167 stores the positional relationships among the units 50, 70, and 110, the sizes of the maximum field of view and ROI size restrictions of the individual units 50, 70, and 110, offset amounts between light paths for the individual light-path combining units 127A and 127B, etc.

The operation of the thus-configured microscope device 100 according to this embodiment will be described below.

The description will be given in the context of a case where, by using the microscope device 100 according to this embodiment, a reference image 171 of the sample S is acquired by the observation unit 50, an ROI where the sample S is to be stimulated by the stimulating unit 70 or an observation image of the sample S is to be acquired by the image capturing unit 110 is specified on the reference image 171, and stimulation or observation is performed.

First, the computer 154 controls the filter turrets 128A and 128B so that the first light-path combining unit 127A and the second light-path combining unit 127B are placed in the light path between the microscope 10 and the observation unit 50.

In the observation unit 50, laser light guided from the laser unit is reflected by the dichroic mirror 61 via the first reflecting mirror 53A or the first beam splitter 55A to the galvanometric scanner 57. Then, the laser light is scanned by the galvanometric scanner 57 and is focused by the pupil projection lens 59. The laser light focused by the pupil projection lens 59 passes through the third connection port 123C to enter the connecting unit 120.

The laser light having entered the connecting unit 120 is transmitted through the fourth relay lens 129D and becomes substantially collimated light, which is reflected by the reflecting mirror 131. Then, the laser light is transmitted through the second light-path combining unit 127B and is then reflected by the first light-path combining unit 127A. The laser light reflected by the first light-path combining unit 127A is focused by the first relay lens 129A and passes through the microscope connection port 121 to enter the microscope 10.

The laser light having entered the microscope 10 is transmitted through the beam splitter 39 via the switching mirror 45 and the image forming lens 27 and irradiates the sample S via the objective lens 23. When fluorescence occurs at the sample S irradiated with the laser light, the fluorescence is collected by the objective lens 23, is transmitted through the image forming lens 27, and is reflected by the switching mirror 45. The fluorescence reflected by the switching mirror 45 passes through the microscope connection port 121 to enter the connecting unit 120.

The fluorescence having entered the connecting unit 120 is transmitted through the first relay lens 129A and is reflected by the first light-path combining unit 127A. Then, the fluorescence is transmitted through the second light-path combining unit 127B and is then reflected by the reflecting mirror 131. The fluorescence reflected by the reflecting mirror 131 is focused by the fourth relay lens 129D and passes through the third connection port 123C to enter the observation unit 50.

The fluorescence having entered the observation unit 50 is de-scanned by the galvanometric scanner 57 and is transmitted through the dichroic mirror 61. The fluorescence transmitted through the dichroic mirror 61 is spectrally split by the dichroic mirrors 63A and 63B via the beam splitter 55B in accordance with the wavelength characteristics. The split fluorescence is focused by the confocal lenses 65A, 65B, and 65C and passes through the confocal pinholes 67A, 67B, and 67C to enter the PMTs 69A, 69B, and 69C.

Figure 7:
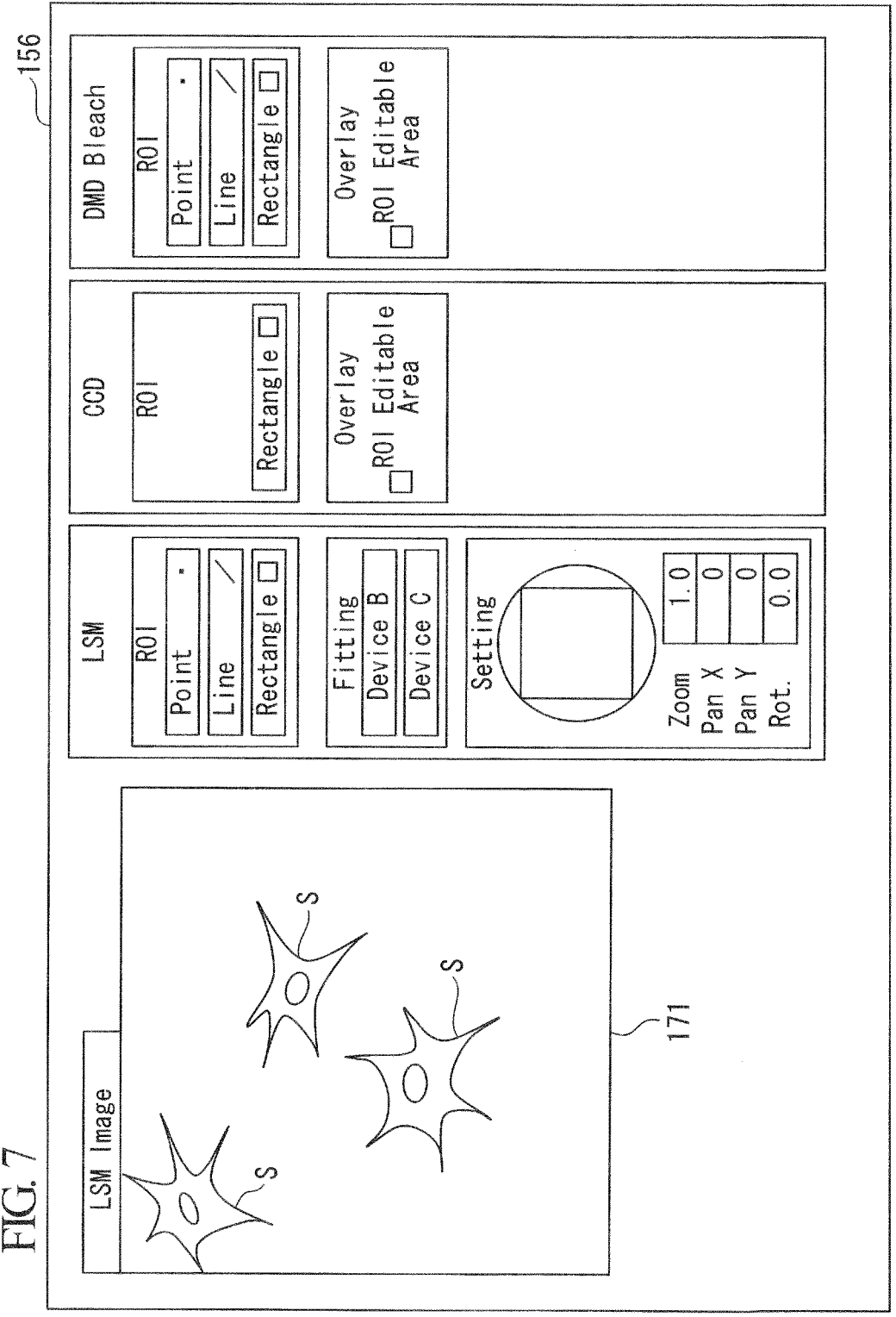
FIG. 7 is a diagram showing a state where the reference image is displayed on a monitor.

The PMTs 69A, 69B, and 69C detect the fluorescence and output detection signals obtained for individual pixels to the computer 154. Then, the image constructing unit 169 in the computer 154 constructs a two-dimensional image of the sample S based on the input detection signals. Thus, for example, as shown in FIG. 7, a screen including the reference image 171 of the sample S ("LSM Image" in the figure) is displayed on the monitor 156.

Figure 8:
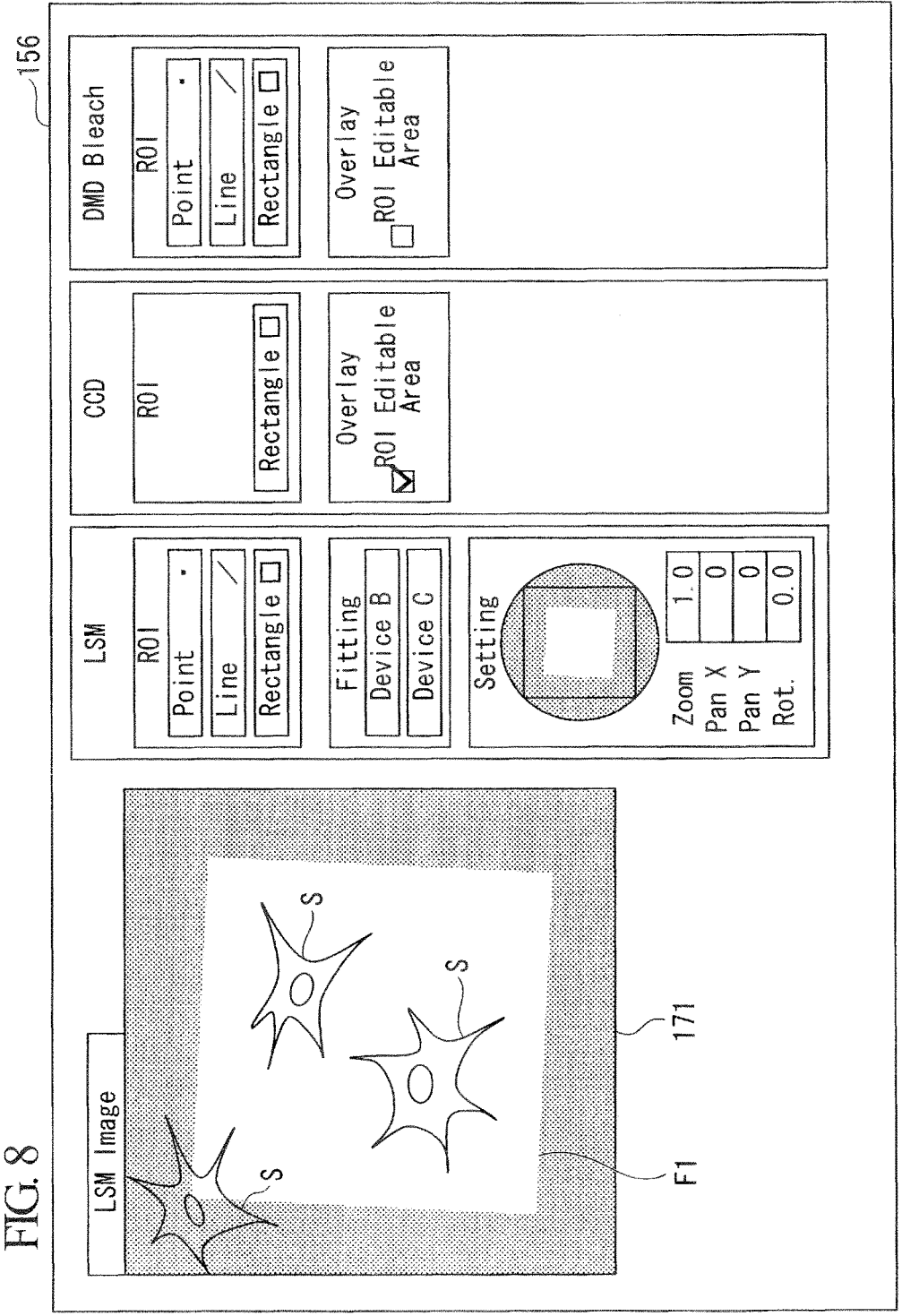
FIG. 8 is a diagram showing a state where a maximum-limit indication is displayed superimposed on the reference image on the monitor.

Now, as shown in FIG. 8, when an item for displaying the maximum-limit indication F1 indicating the maximum field of view of the image capturing unit 110 ("Overlay-ROI Editable Area" under "CCD" in the figure) is checked on the monitor 156, by the operation of the field-of-view displaying unit 163, the maximum-limit indication F1 is displayed superimposed on the reference image 171 based on the size of the maximum field of view of the image capturing unit 110 stored in the memory 167. Thus, it is possible to confirm that a desired sample S exists within the maximum-limit indication F1 when acquiring a reference image 171.

On the reference image 171, the minimum-size indication H may be displayed superimposed, as shown in FIG. 4C. This makes it possible to specify an ROI for an observation image in more detail. This is particularly effective when specifying an ROI for an observation image with a large magnification factor of the reference image 171.

Figure 9:
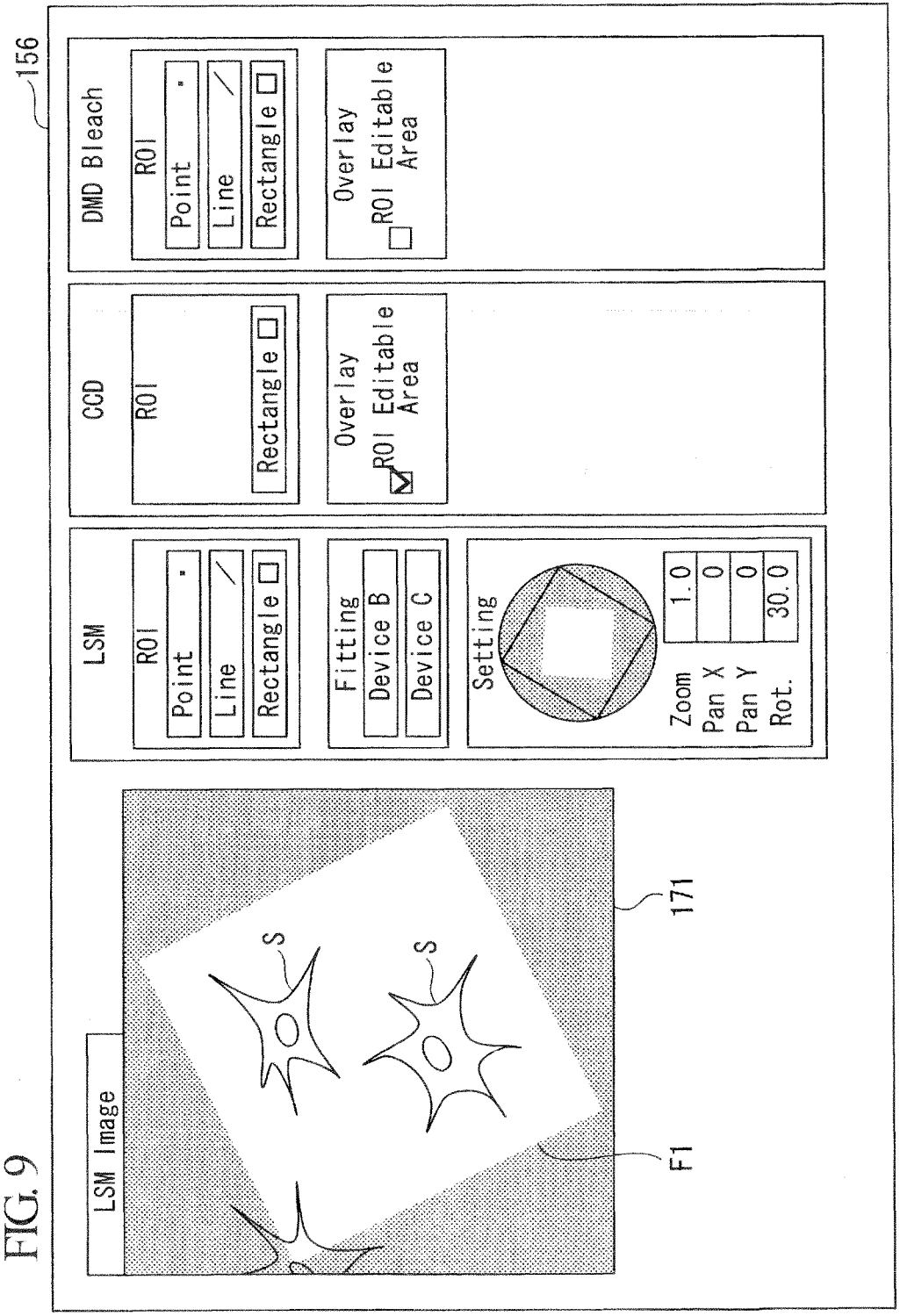
FIG. 9 is a diagram showing a state where the reference image on the monitor has been rotated about the axis of the field of view.

Alternatively, as shown in FIG. 9, when a certain number is entered in an item for performing rotation control of the galvanometric scanner 57 ("Rot" in "Setting" under "LSM" in the figure) on the monitor 156, the controller 165 controls the scan timing of the galvanometric scanner 57 so that the reference image 171 rotated about the axis of the field of view of the observation unit 50 is displayed. In this case, by the operation of the field-of-view displaying unit 163, the maximum-limit indication F1 is updated and displayed in accordance with the rotated reference image 171.

Figure 10:
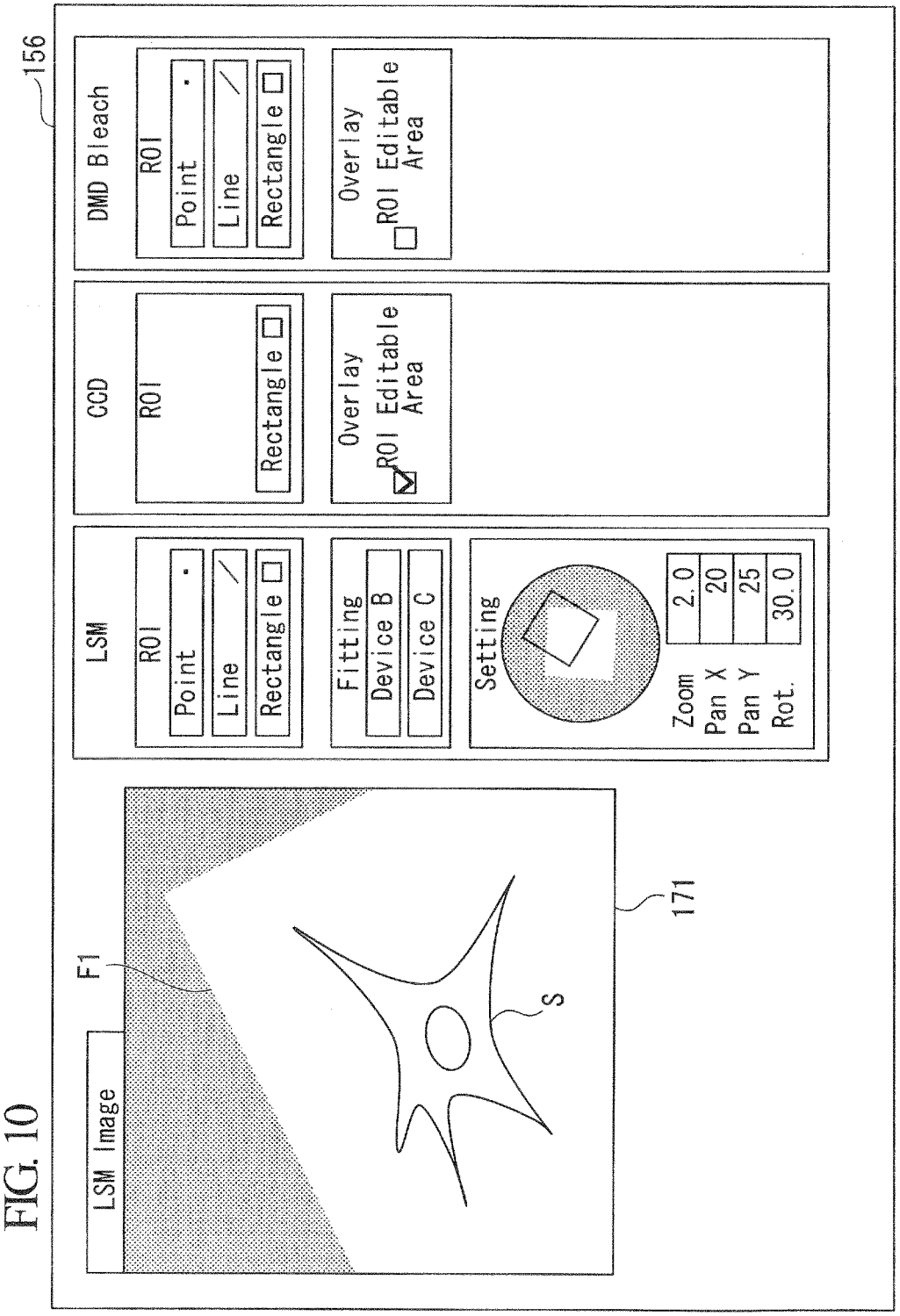
FIG. 10 is a diagram showing a state where the reference image on the monitor has been enlarged and shifted.

Alternatively, as shown in FIG. 10, when certain numbers are entered in items for performing zoom control and pan control of the galvanometric scanner 57 ("Zoom, Pan X, Pan Y" in "Setting" under "LSM" in the figure) on the monitor 156, the controller 165 controls the scan angle and pivot angle range of the galvanometric scanner 57. Thus, it is possible to change (increase in the case of the figure) the magnification factor of the reference image 171 and to display a shifted region for acquiring the reference image 171. In this case, by the operation of the field-of-view displaying unit 163, the maximum-limit indication F1 is updated and displayed in accordance with the shifted reference image 171.

Figure 11:
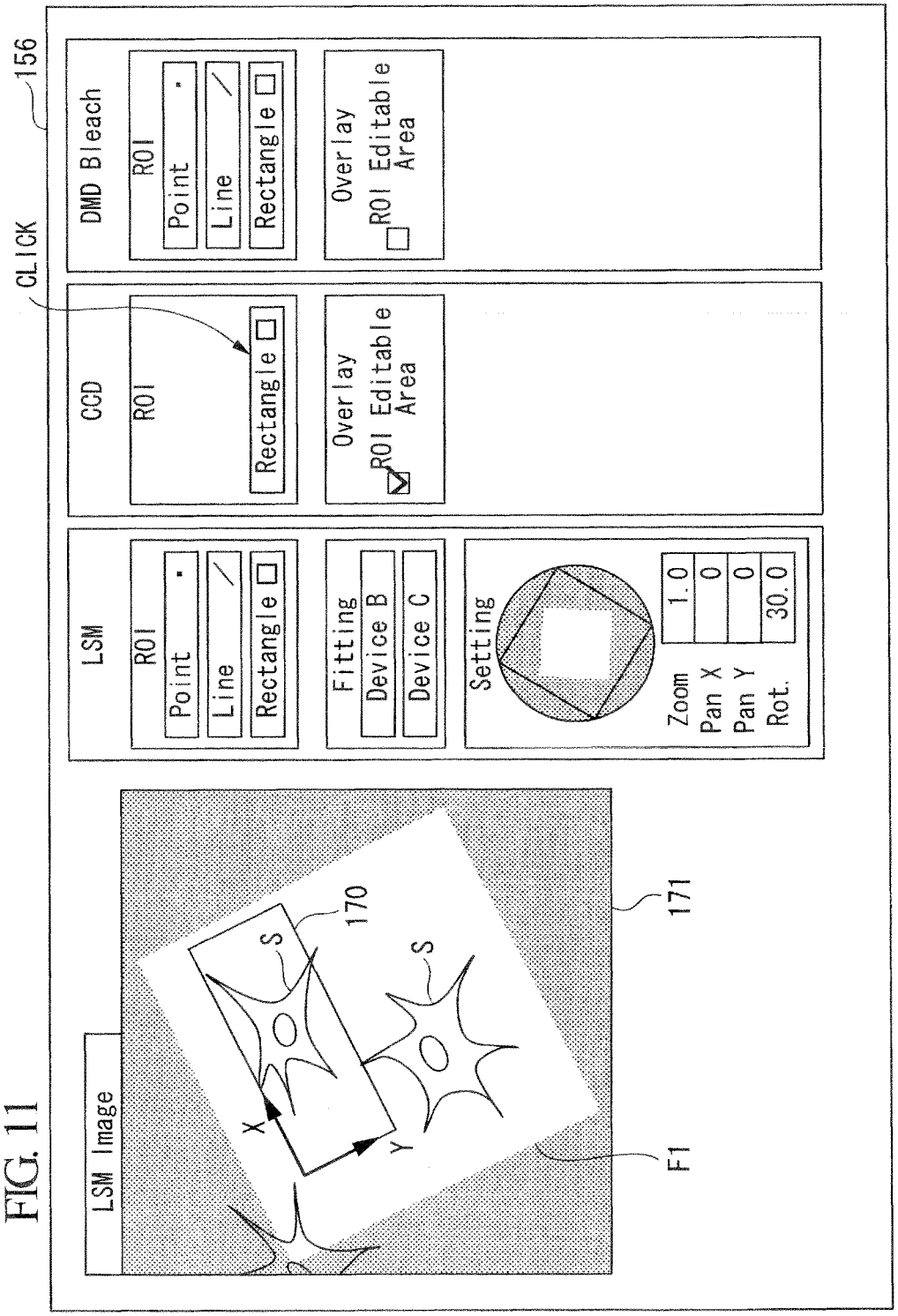
FIG. 11 is a diagram showing a state where an ROI has been specified on the reference image on the monitor.

Then, as shown in FIG. 11, when an item for specifying an ROI for an observation image ("Rectangle" in "ROI" under "CCD" in the figure) is clicked on the monitor 156, the region specifying unit 161 specifies an ROI (reference sign 170 in the figure) for an observation image that is to be captured by the CCD 111 on the reference image 171.

In this case, the field-of-view displaying unit 163 may display the array directions of the pixels of the CCD 111 (X and Y directions) on the reference image 171. Accordingly, for example, by setting the ROI 170 for an observation image such that it is small in the Y direction, the number of lines for partial transfer (subarray transfer) of the CCD 111 is reduced. This serves to increase the frame rate and to thereby reduce the observation time.

Similarly, an ROI for the stimulating unit 70 is specified while viewing the reference image 171 on the monitor 156. Also in this case, the controller 165 may perform rotation control, zoom control, or pan control of the galvanometric scanner 57. Furthermore, the field-of-view displaying unit 163 may display the maximum-size indication G or the minimum-size indication H superimposed on the reference image 171. In this case, for example, the minimum-size indication H is an indication corresponding to the size of each micromirror of the DMD 83.

Next, a case where the sample S in the ROI 170 specified on the reference image 171 is stimulated by the stimulating unit 70 will be described.

First, the computer 154 controls the filter turrets 128A and 128B so that the first light-path combining unit 127C and the second light-path combining unit 127D having suitable wavelength characteristics are placed in the light path between the microscope 10 and the stimulating unit 70.

Figure 12A:
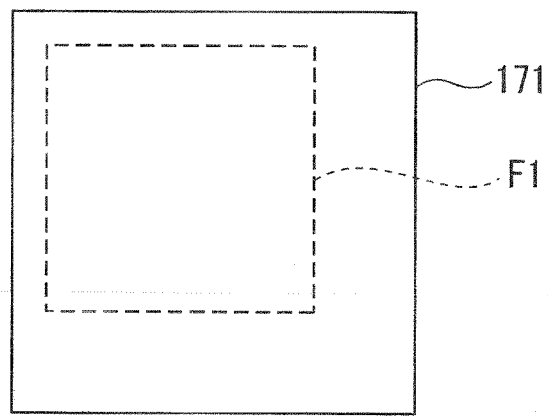
FIG. 12A is a diagram showing a state where a maximum-limit indication is displayed superimposed on the reference image in a case where a certain light-path combining unit is placed.
Figure 12B:
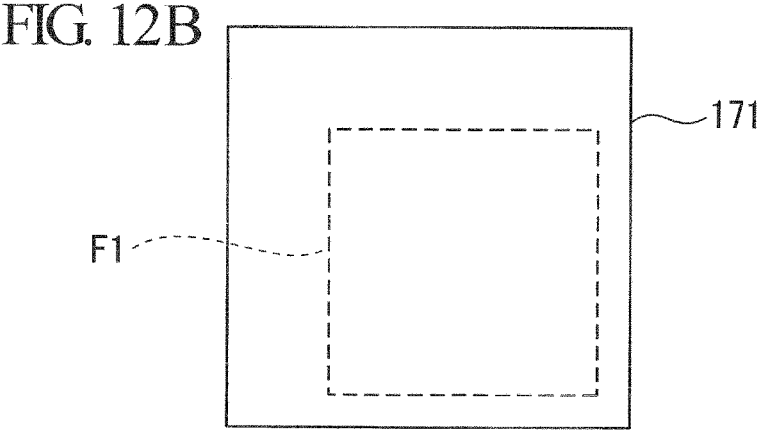
FIG. 12B is a diagram showing a state where a maximum-limit indication is displayed superimposed at a different position on the reference image in a case where a light-path combining unit different from that in FIG. 12A is placed.

In this case, by the operation of the field-of-view displaying unit 163, the position of the maximum-limit indication F1 is corrected based on the offset amounts for the light-path combining units 127C and 127D stored in the memory 167. Thus, even if the position of the maximum-limit indication F1 on the reference image 171 differs between the case where the light-path combining units 127A and 127B are placed in the light path, as shown in FIG. 12A, and the case where the light-path combining units 127C and 127D are placed in the light path, as shown in FIG. 12B, it is possible to specify an ROI 170 effectively within the maximum field of view of the stimulating unit 70.

In the stimulating unit 70, light emitted from the mercury lamp 73 enters the DMD 83 via the shutter 75, the excitation filter 77, the focusing lens 79, and the first reflecting mirror 81A. The light having entered the DMD 83 is reflected by micromirrors in the ON area and is transmitted through the relay optical system 85 and the second beam splitter 87B. The light transmitted through the second beam splitter 87B passes through the second connection port 123B to enter the connecting unit 120.

The light having entered the connecting unit 120 is transmitted through the third relay lens 129C to become substantially collimated light, and the light is reflected by the second light-path combining unit 127D and the first light-path combining unit 127C. The light reflected by the first light-path combining unit 127C is focused by the first relay lens 129A and passes through the microscope connection port 121 to enter the microscope 10. The light having entered the microscope 10 irradiates the sample S in the ROI 170 specified by the region specifying unit 161 via the switching mirror 45, the image forming lens 27, and the objective lens 23, whereby the sample S is stimulated.

Next, a case where an observation image of the sample S in the ROI 170 specified on the reference image 171 is acquired by the image capturing unit 110 will be described.

First, the computer 154 controls the filter turrets 128A and 128B so that the first light-path combining unit 127E having suitable wavelength characteristics is placed in the light path between the microscope 10 and the image capturing unit 110. Also in this case, by the operation of the field-of-view displaying unit 163, the position of the maximum-limit indication F1 is corrected based on the offset amount for the light-path combining unit 127E stored in the memory 167.

In the image capturing unit 110, excitation light emitted from the mercury lamp 37 irradiates the sample S in the ROI 170 for acquiring an observation image, specified by the region specifying unit 161, via the beam splitter 39 and the objective lens 23. When fluorescence occurs at the sample S irradiated with the excitation light, the fluorescence is transmitted through the beam splitter 39 and the image forming lens 27 and is reflected by the switching mirror 45. The fluorescence reflected by the switching mirror 45 passes through the microscope connection port 121 to enter the connecting unit 120.

The fluorescence having entered the connecting unit 120 is transmitted through the first relay lens 129A, the first light-path combining unit 127E, and the second relay lens 129B and passes through the first connection port 123A to enter the image capturing unit 110. The fluorescence having entered the image capturing unit 110 is captured by the CCD 111 via the camera adapter 113. The observation image of the sample S acquired by the CCD 111 is displayed on the monitor 156.

As described above, with the microscope device 100 according to this embodiment, by specifying an ROI 170 for stimulation by the stimulating unit 70 or an ROI 170 for acquiring an observation image by the image capturing unit 110 on a reference image 171 acquired by the observation unit 50, it is possible to readily select a sample S and perform light stimulation or observation as desired. In this case, since the field-of-view displaying unit 163 displays the maximum-limit indication F1 indicating the maximum field of view of the stimulating unit 70 or the image capturing unit 110 superimposed on the reference image 171, it is possible to ascertain in advance an ROI that can be specified when acquiring the reference image 171.

Thus, even when the maximum field of view varies among the units 50, 70, and 110, it is possible to avoid reacquiring a reference image 171 in accordance with a desired ROI 170. Accordingly, it is possible to fully utilize the fields of view of the individual units 50, 70, and 110 and to improve working efficiency.

Figure 13:
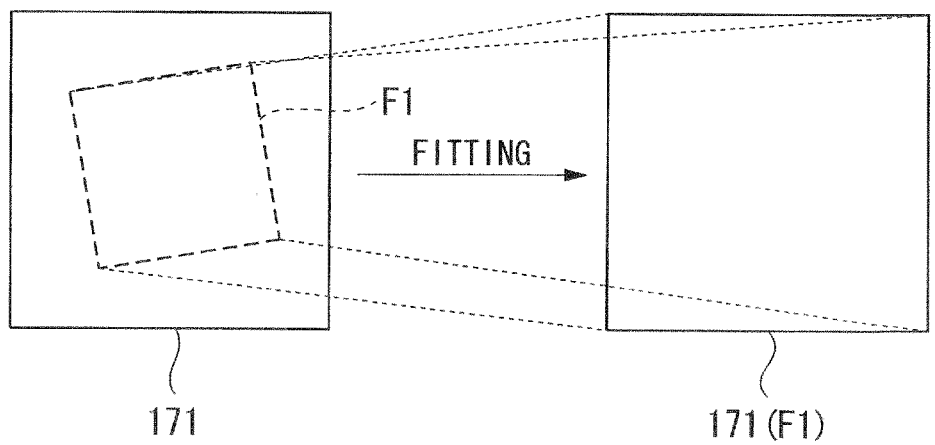
FIG. 13 is a diagram showing a state where a maximum-limit indication is displayed so as to include the entire reference image.
Figure 14:
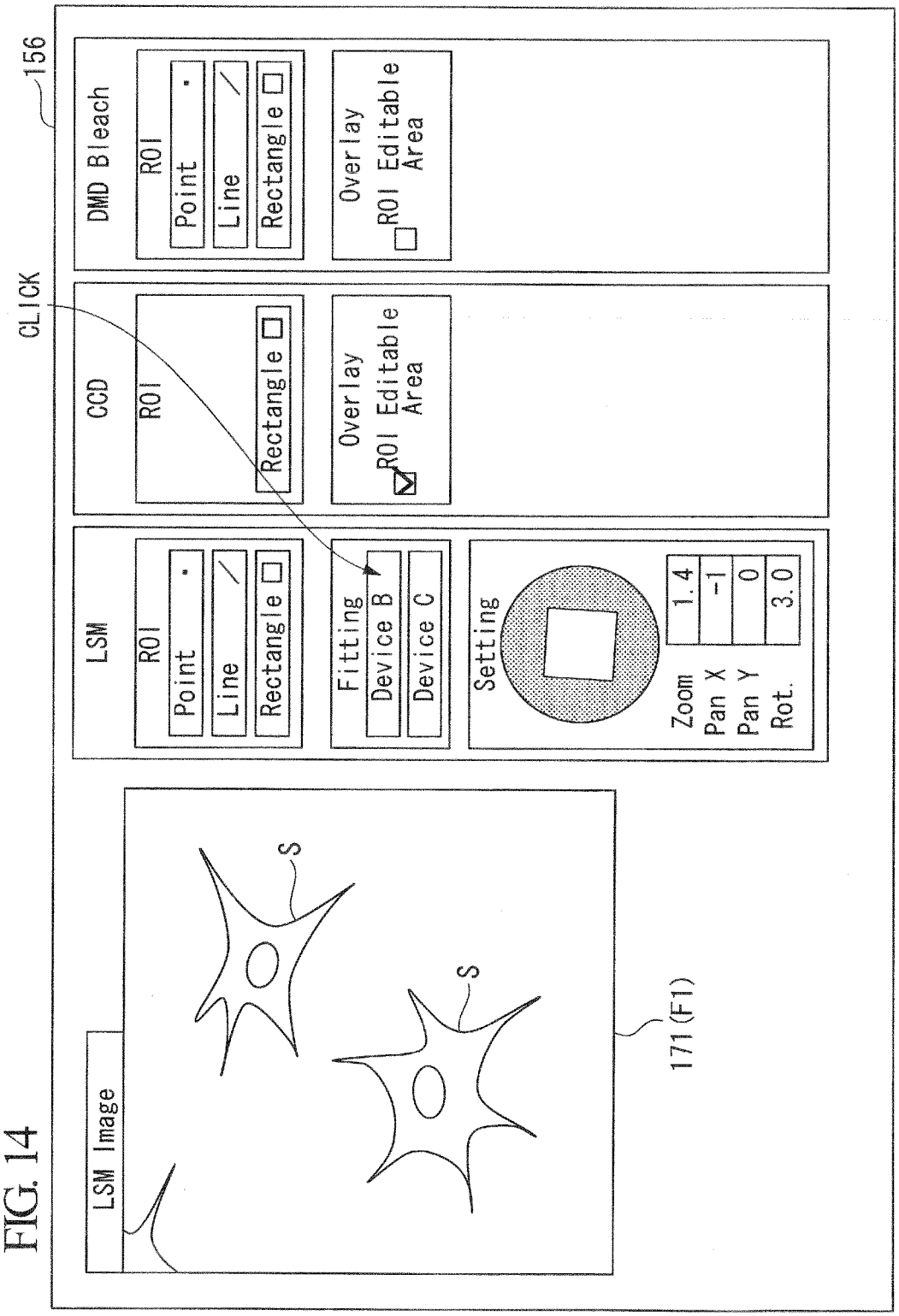
FIG. 14 is a diagram showing a state where a maximum-limit indication is displayed so as to include the entire reference image on the monitor.

In the embodiment, the controller 165 may function as a fitting device that matches the region where a reference image 171 is acquired with the size of the maximum field of view of the stimulating unit 70 or the image capturing unit 110. Accordingly, as shown in FIG. 13, it is possible to display the maximum-limit indication F1 so as to include the entire reference image 171. In this case, as shown in FIG. 14, for example, by clicking on "Device B" in "Fitting" under "LSM" on the monitor 156, the controller 165 controls the scanning parameters of the galvanometric scanner 57 based on the size of the maximum field of view of the stimulating unit 70 or the image capturing unit 110 stored in the memory 167. By displaying the maximum-limit indication F1 so as to include the entire reference image 171 as described above, it is possible to exclude an unnecessary region where it is not possible to specify an ROI from the reference image 171.

Although the embodiment has been described in the context of a case where an observation image of the sample S is acquired by the image capturing unit 110, alternatively, an observation image of the sample S may be acquired by using the galvanometric scanner 58 of the observation unit 50. In this case, first, a reference image 171 is acquired by using the galvanometric scanner 57 of the observation unit 50, and then the galvanometric scanner 57 is switched to the galvanometric scanner 58. Then, the field-of-view displaying unit 163 displays, superimposed on the reference image 171, the maximum-limit indication F1 indicating the maximum field of view of the observation unit 50 in the case of using the galvanometric scanner 58.

Figure 15:
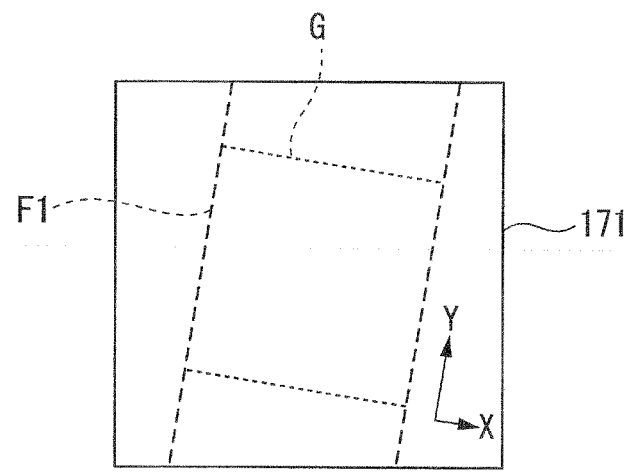
FIG. 15 is a diagram showing a state where a maximum-limit indication is displayed superimposed on the reference image by using a resonant galvanometric scanner.

The galvanometric scanner 58 allows pan control only in the Y direction and does not allow pan control in the X direction. Therefore, for example, as shown in FIG. 15, there is no limit as to the maximum field of view with respect to the Y direction, whereas the size of a largest image that can be acquired at once (the maximum-size indication G) defines the size of the maximum field of view (the maximum-limit indication F1) with respect to the X direction. The field of view with respect to the Y direction in the case of using the galvanometric scanner 58 is the same as that in the case of using the galvanometric scanner 57, and it is possible to give an offset by pan control within the field of view. However, the field of view with respect to the X direction is smaller compared with that in the case of using the galvanometric scanner 57.

When the maximum-size indication G for an observation image is displayed superimposed on the reference image 171 by the operation of the field-of-view displaying unit 163, an area surrounded by dotted lines in the X and Y directions in FIG. 15 corresponds to the maximum-size indication G. If it is possible to acquire an observation image of the sample S at once, working efficiency is improved compared with the case where multiple operations are needed for acquisition. Therefore, by displaying the maximum-size indication G, it is possible to simply and readily find a sample S of a size suitable for observation. Accordingly, it is possible to avoid having to respecify an ROI for an observation image.

The controller 165 may set an ROI such that it is small in the Y direction. This serves to increase the frame rate and to thereby shorten the time required.

Although the embodiment has been described in the context of a case where the sample S is stimulated by using the DMD 83 of the stimulating unit 70, alternatively, for example, the sample S may be stimulated by using the galvanometric scanner 89.

The embodiment can be modified in the following ways.

Figure 16A:
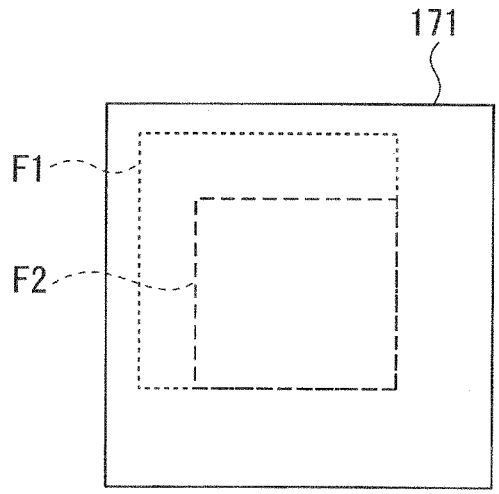
FIG. 16A is a diagram showing a state where a common-limit indication is displayed superimposed on the reference image in a case where a certain light-path combining unit is placed in a microscope device according to a modification of the embodiment.
Figure 16B:
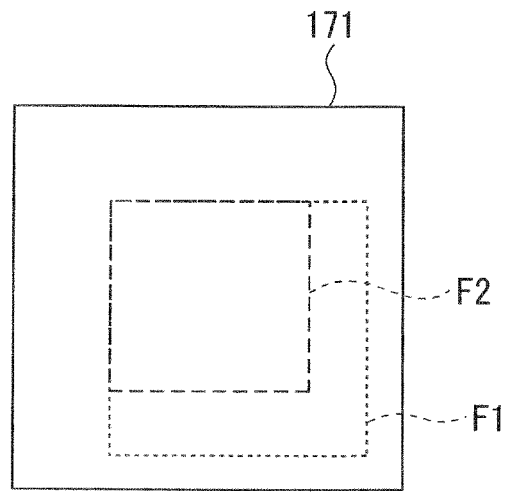
FIG. 16B is a diagram showing a state where a common-limit indication is displayed superimposed on the reference image in a case where a light-path combining unit different from that in FIG. 16A is placed.

For example, although the field-of-view displaying unit 163 displays the maximum-limit indication F1 indicating the maximum field of view of the unit 110, 50, or 70 superimposed on the reference image 171 in the embodiment, alternatively, for example, as shown in FIGS. 16A and 16B, the field-of-view displaying unit 163 may display a common-limit indication F2 indicating a common field of view common to all the units 50, 70, and 110 based on the offset amounts for the light-path combining units 127A, 127B, 127C, 127D, and 127E.

Accordingly, when acquiring a reference image 171, it is possible to ascertain in advance a stimulation region or an observation-image acquisition region that can be specified with reference to the common-limit indication F2 displayed by the field-of-view displaying unit 163. In this case, even when switching is performed among the light-path combining units 127A, 127B, 127C, 127D, and 127E, it is possible to constantly display the same common-limit indication F2 superimposed on the reference image 171, as in the case of the common-limit indication F2 in the case where the light-path combining units 127A and 127B are placed in the light path, as shown in FIG. 16A, and the common-limit indication F2 in the case where the light-path combining units 127C and 127D are placed in the light path, as shown in FIG. 16B. For example, this is particularly effective in a case where the sample S is stimulated or observed continuously while performing switching among the light-path combining units 127A, 127B, 127C, 127D, and 127E.

In this modification, the field-of-view displaying unit 163 may display the maximum-size indication G or the minimum-size indication H together with the common-limit indication F2 superimposed on the reference image 171 or may display the scanning directions of the galvanometric scanner 57 (X and Y directions) or the array directions of the pixels of the CCD 111 (X and Y directions) on the reference image 171. Alternatively, the controller 165 may function as a fitting device that matches a region where a reference image 171 is to be acquired with the size of a common field of view common to all the units 50, 70, and 110. Accordingly, it is possible to display the common-limit indication F2 so as to include the entire reference image 171. The arrangement may be such that the computer 154 can arbitrarily select whether the field-of-view displaying unit 163 displays the maximum-limit indication F1 indicating the maximum field of view for each of the units 50, 70, and 110 or displays the common-limit indication F2 indicating a common field of view common to the units 50, 70, and 110.

Although the embodiment of the present invention has been described in detail with reference to the drawings, the specific configurations are not limited to the embodiment, and design modifications or the like not departing from the spirit of the present invention are encompassed.

For example, it is acceptable to perform ON/OFF switching to choose whether or not to display the maximum-limit indication F1 or the common-limit indication F2 on the reference image 171.

Furthermore, although the observation unit 50, the stimulating unit 70, and the image capturing unit 110 are connected to the connecting unit 120 in the above-described embodiment, alternatively, the connecting unit 120 may have two unit connection ports, and observation optical systems or stimulation optical systems may be connected to the microscope 10. Alternatively, the connecting unit 120 may have three or more unit connection ports, and three or more observation optical systems or stimulation optical systems may be connected to the microscope 10.

What is claimed is:

1. A microscope device comprising:
a plurality of observation optical systems that are capable of acquiring images of a same sample;
a region specifying unit that specifies, on a reference image acquired by one of the observation optical systems, an acquisition region for acquiring an observation image with another one of the observation optical systems;
a field-of-view displaying unit that displays, superimposed on the reference image, an indication indicating a maximum field of view of the other observation optical system;
a plurality of light-path combining units that combine light paths of the observation optical systems;
a switching unit that allows selective insertion or removal of the light-path combining units into or from the light paths; and
a storage unit that stores offset amounts between the light paths for the individual light-path combining units,
wherein the field-of-view displaying unit corrects a position of the indication indicating the maximum field of view of the other observation optical system based on an offset amount of the light-path combining unit selected by switching with the switching unit.

2. The microscope device according to claim 1, further comprising a fitting device that matches an acquisition region of the reference image with the maximum field of view of the other observation optical system.

3. The microscope device according to claim 1, wherein the field-of-view displaying unit further displays, superimposed on the reference image, an indication indicating a size of a largest observation image that can be acquired at once by the other observation optical system.

4. The microscope device according to claim 1, wherein the field-of-view displaying unit further displays, superimposed on the reference image, an indication indicating a size of a smallest observation image that can be acquired by the other observation optical system.

5. The microscope device according to claim 1, wherein:
the other observation optical system includes a scanning unit that scans light two-dimensionally over the sample, and
the field-of-view displaying unit further displays scanning directions of the scanning unit on the reference image.

6. The microscope device according to claim 1, wherein:
the other observation optical system includes an image capturing element having a plurality of pixels that are arrayed two-dimensionally, and
the field-of-view displaying unit further displays array directions of the pixels on the reference image.

* * * * *